United States Patent
Lazer et al.

(10) Patent No.: US 12,210,539 B2
(45) Date of Patent: Jan. 28, 2025

(54) ONE BY ONE SELECTION OF ITEMS OF A SET

(71) Applicant: GSI Technology Inc., Sunnyvale, CA (US)

(72) Inventors: Moshe Lazer, Binyamina (IL); Eli Ehrman, Beit Shemesh (IL)

(73) Assignee: GSI Technology Inc., Sunnyvale, CA (US)

( * ) Notice: Subject to any disclaimer, the term of this patent is extended or adjusted under 35 U.S.C. 154(b) by 0 days.

(21) Appl. No.: 18/542,690

(22) Filed: Dec. 17, 2023

(65) Prior Publication Data

US 2024/0119061 A1    Apr. 11, 2024

Related U.S. Application Data

(62) Division of application No. 17/189,316, filed on Mar. 2, 2021, now Pat. No. 11,860,885, which is a division of application No. 15/690,305, filed on Aug. 30, 2017, now Pat. No. 10,956,432.

(51) Int. Cl.
| | |
|---|---|
| *G06F 7/00* | (2006.01) |
| *G06F 16/22* | (2019.01) |
| *G06F 16/245* | (2019.01) |
| *G06F 16/2458* | (2019.01) |
| *G06F 16/28* | (2019.01) |

(52) U.S. Cl.
CPC ...... *G06F 16/2465* (2019.01); *G06F 16/2237* (2019.01); *G06F 16/245* (2019.01); *G06F 16/283* (2019.01)

(58) Field of Classification Search
CPC ............. G06F 16/2237; G06F 16/2465; G06F 16/245; G06F 16/283; G06F 16/903; G06F 16/24545; G06F 16/24558
See application file for complete search history.

(56) References Cited

U.S. PATENT DOCUMENTS

| | | | | |
|---|---|---|---|---|
| 3,851,313 A | * | 11/1974 | Chang | G11C 11/4026 365/239 |
| 3,863,232 A | * | 1/1975 | Johnson | G11C 15/04 365/231 |
| 5,295,101 A | * | 3/1994 | Stephens, Jr. | G11C 29/88 365/230.03 |
| 5,452,244 A | * | 9/1995 | Mohan Rao | G11C 11/565 365/230.06 |
| 5,506,810 A | * | 4/1996 | Runas | G11C 7/1021 365/230.09 |
| 5,950,191 A | * | 9/1999 | Schwartz | G06F 16/9024 707/E17.011 |
| 6,181,632 B1 | * | 1/2001 | Kondo | H04N 19/61 365/230.03 |

(Continued)

*Primary Examiner* — Mohammed R Uddin
(74) *Attorney, Agent, or Firm* — Heidi Brun Associates, Ltd.

(57) ABSTRACT

A method for selecting items one by one from a set of items elected from a large dataset of items includes determining whether or not a density of the set is sparse. If the density is sparse, the method includes repeatedly performing an extreme item select (EIS) method to select a next one of the elected items from the set and removing the next one from the set to create a next set. If the density is not sparse, the method includes performing a next index select (NIS) method to create a linked list of the elected items and to repeatedly select a next elected item from the set.

10 Claims, 10 Drawing Sheets

(56) References Cited

U.S. PATENT DOCUMENTS

| | | | |
|---|---|---|---|
| 6,278,992 B1 * | 8/2001 | Curtis | G06F 16/2237 707/711 |
| 6,505,225 B1 * | 1/2003 | Takayanagi | G06F 7/505 708/670 |
| 7,822,944 B2 * | 10/2010 | Schuessler | G06K 7/0008 711/217 |
| 8,238,173 B2 | 8/2012 | Akerib | |
| 8,321,485 B2 * | 11/2012 | Yasuda | G06F 16/319 707/742 |
| 9,372,877 B2 * | 6/2016 | Raghunathan | G06F 16/221 |
| 9,418,719 B2 | 8/2016 | Akerib | |
| 9,558,812 B2 | 1/2017 | Akerib | |
| 9,859,005 B2 | 1/2018 | Akerib | |
| 2002/0004862 A1 * | 1/2002 | Horikomi | H04N 19/625 375/E7.231 |
| 2002/0122597 A1 * | 9/2002 | Kikuchi | H04N 19/93 382/232 |
| 2003/0135495 A1 * | 7/2003 | Vagnozzi | G06F 16/2272 |
| 2005/0281562 A1 * | 12/2005 | Pappalardo | H04B 10/801 398/183 |
| 2007/0052736 A1 * | 3/2007 | Inazumi | G06F 3/14 345/690 |
| 2007/0174369 A1 * | 7/2007 | Detlefs | G06F 12/0269 |
| 2008/0133565 A1 | 6/2008 | Yasuda | |
| 2011/0153980 A1 * | 6/2011 | Sasao | H03K 19/1733 712/7 |
| 2012/0096213 A1 * | 4/2012 | Kato | G06F 12/0862 711/3 |
| 2012/0198174 A1 * | 8/2012 | Nellans | G06F 3/065 711/E12.009 |
| 2013/0007419 A1 | 1/2013 | Bajenaru | |
| 2013/0018856 A1 * | 1/2013 | Pedersen | H03M 7/30 707/693 |
| 2014/0129530 A1 * | 5/2014 | Raufman | G06F 16/901 707/693 |
| 2015/0131383 A1 | 5/2015 | Akerib | |
| 2015/0146491 A1 * | 5/2015 | Akerib | G11C 7/18 365/189.02 |
| 2015/0200009 A1 * | 7/2015 | Akerib | G11C 15/00 711/114 |
| 2015/0370794 A1 | 12/2015 | Yochai | |
| 2016/0378828 A1 | 12/2016 | Hopcroft | |
| 2017/0075933 A1 * | 3/2017 | Lewak | G06F 16/24562 |
| 2019/0057092 A1 * | 2/2019 | Craske | G06F 16/2246 |
| 2021/0056085 A1 * | 2/2021 | Akerib | G06F 16/1748 |
| 2021/0344864 A1 * | 11/2021 | Iwashina | H04N 25/766 |
| 2022/0138173 A1 * | 5/2022 | Gaumnitz | G06F 16/2237 707/700 |
| 2023/0019782 A1 * | 1/2023 | Barve | G06F 16/2457 |

* cited by examiner

FIG. 6

| Index | 0 | 1 | 2 | 3 | 4 | 5 | 6 | 7 | 8 | 9 | 10 | 610

| Marker | 0 | 0 | 0 | 1 | 0 | 1 | 0 | 0 | 0 | 0 | 1 | 630

| Temp | 0 | 0 | 0 | 1 | 0 | 1 | 0 | 0 | 0 | 0 | 1 | 635

| Delta | 0 | 0 | 0 | 0 | 0 | 0 | 0 | 0 | 0 | 0 | 0 | 640

| List | 0 | 0 | 0 | 0 | 0 | 0 | 0 | 0 | 0 | 0 | 0 | 650

FIG. 8

| $Temp_1$ | 0 | 0 | 0 | 1 | 0 | 1 | 0 | 0 | 0 | 0 | 1 |
| $Temp_2$ | 0 | 0 | 1 | 1 | 1 | 1 | 0 | 0 | 0 | 1 | 1 |

635

| $Temp_k$ | 1 | 1 | 1 | 1 | 1 | 1 | 1 | 1 | 1 | 1 | 1 |

| $Delta_1$ | 0 | 0 | 0 | 0 | 0 | 0 | 0 | 0 | 0 | 0 | 0 |
| $Delta_2$ | 1 | 1 | 1 | 0 | 1 | 0 | 1 | 1 | 1 | 1 | 0 |

640

| $Delta_k$ | 3 | 2 | 1 | 0 | 1 | 0 | 4 | 3 | 2 | 1 | 0 |

FIG. 9

ONE BY ONE SELECTION OF ITEMS OF A SET

CROSS REFERENCE TO RELATED APPLICATIONS

This application is a divisional application of U.S. patent application Ser. No. 17/189,316, filed Mar. 2, 2021, which is a divisional application of U.S. patent application Ser. No. 15/690,305, filed Aug. 30, 2017, which is incorporated herein by reference.

FIELD OF THE INVENTION

The present invention relates to associative computation generally and to data mining algorithms using associative computation in particular.

BACKGROUND OF THE INVENTION

Applications often need to pick or retrieve several elected items, one by one, from a large dataset of items. A set of elected items may be created in one of the following ways: manually selected by a user; created by an algorithm; or as a result of a search or any other procedure that produces a set of items needed by the application.

In the dataset, items belonging to the set are explicitly identified as being part of the set. The items in the set may be retrieved one after the other, such that, in each retrieval step, a single item from the set is retrieved. After its retrieval, the retrieved item may be removed from the set, so as not to be retrieved again. A method for choosing which item to retrieve in each specific step is referred herein as "item select". It may be appreciated that the application may repeat the retrieval step until all items in the set have been retrieved and the set is emptied.

It is assumed that the order of retrieving items from the set has no implicit importance, as long as all the items in the set are eventually retrieved. The naive "item select" method may be used to select an item by its location in the dataset. In each retrieve operation, the entire dataset may be scanned, starting from the first item until an item belonging to the set is found. Once read, a "read" indication may be assigned to the read item, and the application may perform the next retrieve operation.

It may be appreciated that the complexity of a single retrieve operation that scans the entire dataset is $O(N)$, where N is the size of the dataset, and the complexity of reading an entire set having P items is $O(P*N)$.

SUMMARY OF THE PRESENT INVENTION

There is provided, in accordance with a preferred embodiment of the present invention, a method for selecting items one by one from a set of items elected from a large dataset of items. The method includes determining whether or not a density of the set is sparse. If the density is sparse, the method includes repeatedly performing an extreme item select (EIS) method to select a next one of the elected items from the set and removing the next one from the set to create a next set. If the density is not sparse, the method includes performing a next index select (NIS) method to create a linked list of the elected items and to repeatedly select a next elected item from the set.

Moreover, in accordance with a preferred embodiment of the present invention, the dataset is stored in an associative memory array.

Furthermore, in accordance with a preferred embodiment of the present invention, the method also includes creating a marker vector having a same size as the dataset, where all indices of the elected items have a first value and all indices of non-elected items have a second value.

Still further, in accordance with a preferred embodiment of the present invention, the first value is "1" and the second value is "0".

Additionally, in accordance with a preferred embodiment of the present invention, the determining includes counting a number of the first value in the marker vector to produce a size, dividing the size by a number of items in the dataset and comparing a result of the dividing to a predefined value to provide the density.

Moreover, in accordance with a preferred embodiment of the present invention, the determining includes counting a number of the first value in the marker vector to produce a size and comparing the size to a predefined value to provide the density.

There is provided, in accordance with a preferred embodiment of the present invention, a system for selecting items one by one from a set of items elected from a large dataset of items. The system includes an item selector, an extreme item selector (EIS) and a next index selector (NIS). The item selector determines if a density of the set is sparse. The EIS repeatedly selects a next one of the elected items from the set and removes the next one from the set to create a next set if the set is sparse. The NIS creates a linked list of the elected items and repeatedly selects a next elected item from the set if the set is not sparse.

Furthermore, in accordance with a preferred embodiment of the present invention, the system also includes an associative memory array to store the dataset.

Still further, in accordance with a preferred embodiment of the present invention, the system includes a marker vector having a same size as the dataset where indices of the elected items are marked with a first value and indices of non-elected items are marked with a second value.

Moreover, in accordance with a preferred embodiment of the present invention, the first value is "1" and the second value is "0".

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 6 is a schematic illustration of exemplary data stored in the system of FIG. 1 and its usage by a next item selector, according to a preferred embodiment of the present invention;

FIGS. 8 and 9 are schematic illustrations of data created and manipulated by the flow of FIG. 7 to create the deltas between items of the set, according to a preferred embodiment of the present invention;

Figure 1:
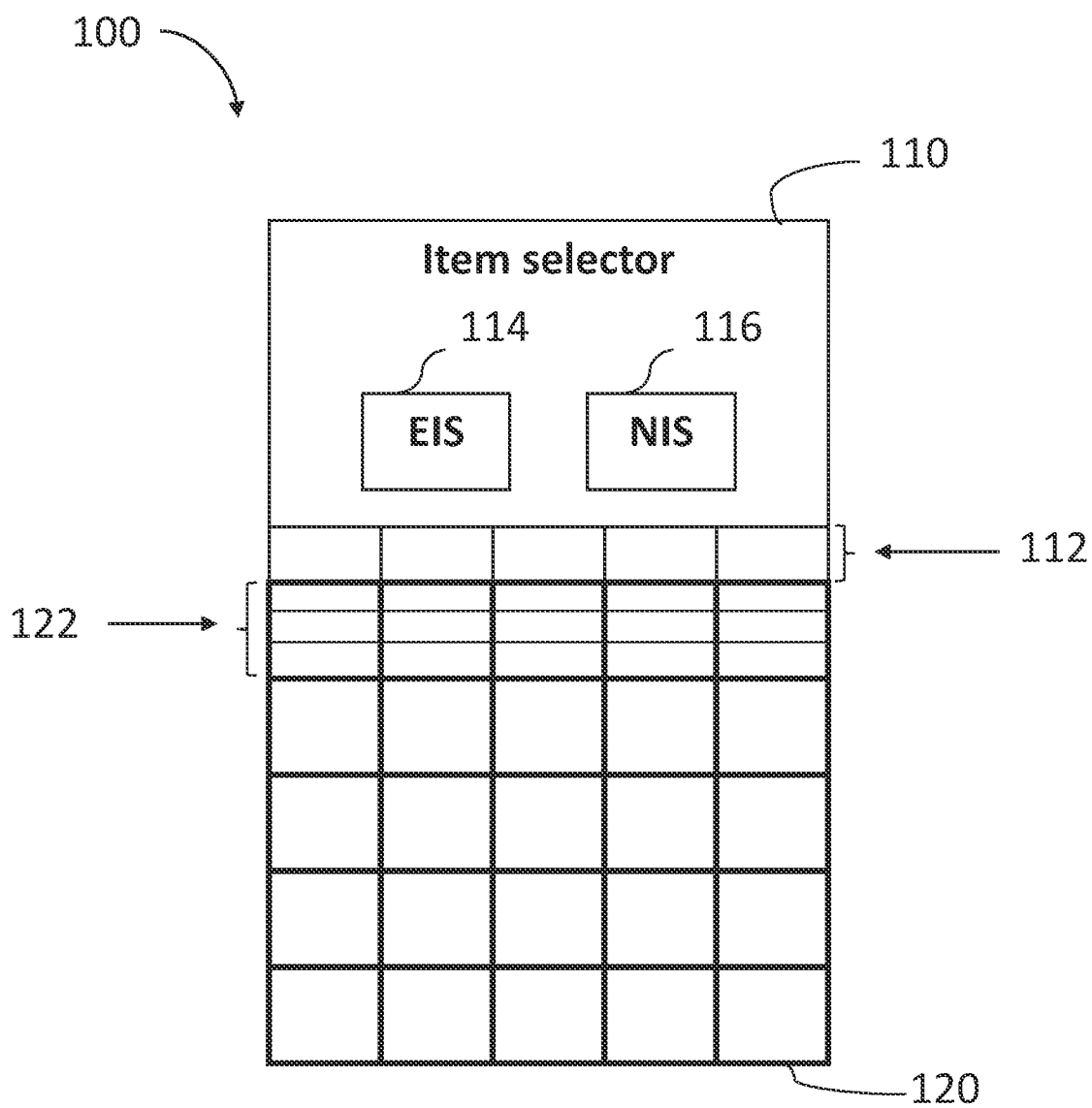
FIG. 1 is a schematic illustration of an item select system, constructed and operative in accordance with a preferred embodiment of the present invention.

It will be appreciated that for simplicity and clarity of illustration, elements shown in the FIGURES have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that selecting an item by scanning the entire dataset, starting from the first item all over again for each item in the set, is not efficient as the complexity is proportional to the dataset size. As the dataset grows, the average time to fetch or pick or select an item will increase, and the response time may worsen.

Applicant has further realized that associative memory devices may be used to store large datasets and may provide an efficient in-memory system that may perform the "item select" method in a constant computation complexity, O(1), regardless of the size of the dataset.

Memory devices that may provide such constant complexity are described in U.S. Pat. No. 8,238,173 (entitled "USING STORAGE CELLS TO PERFORM COMPUTATION"), issued on Aug. 7, 2012; US Patent Publication No. US 2015/0131383, (entitled "NONVOLATILE IN-MEMORY COMPUTING DEVICE"), published on May 14, 2015 and issued on Nov. 10, 2020 as U.S. Pat. Nos. 10,832,746; 9,859,005 (entitled "MEMORY DEVICE"), issued on Jan. 2, 2018; U.S. Pat. No. 9,418,719 issued on Aug. 16, 2016 (entitled "IN-MEMORY COMPUTATIONAL DEVICE") and U.S. Pat. No. 9,558,812 issued on Jan. 31, 2017 (entitled "SRAM MULTI-CELL OPERATIONS"), all assigned to the common assignee of the present invention and incorporated herein by reference.

FIG. 1, to which reference is now made, schematically illustrates an item select system 100, constructed and operative in accordance with a preferred embodiment of the present invention. Item select system 100 comprises an item selector 110 and an associative memory array 120 that may store the dataset and any related information.

Item selector 110 may select an item from the set according to one of the selection methods described hereinbelow. Item selector 110 further comprises a found and selected (FS) vector 112, an "extreme item selector" (EIS) 114 that selects an item having the highest/lowest index in the set, and a "next index selector" (NIS) 116 that selects a next item in a linked list of items, described in detail hereinbelow.

Item selector 110 may add an indication of the selected item to FS 112 that may be used to fetch or pick the selected item. Item selector 110 may remove the indication from FS 112 after the item is fetched. It may be appreciated that in each fetch operation, a single indication is present in FS vector 112. Item selector 110 may further remove the item from the set after it has been fetched.

Figure 2A:
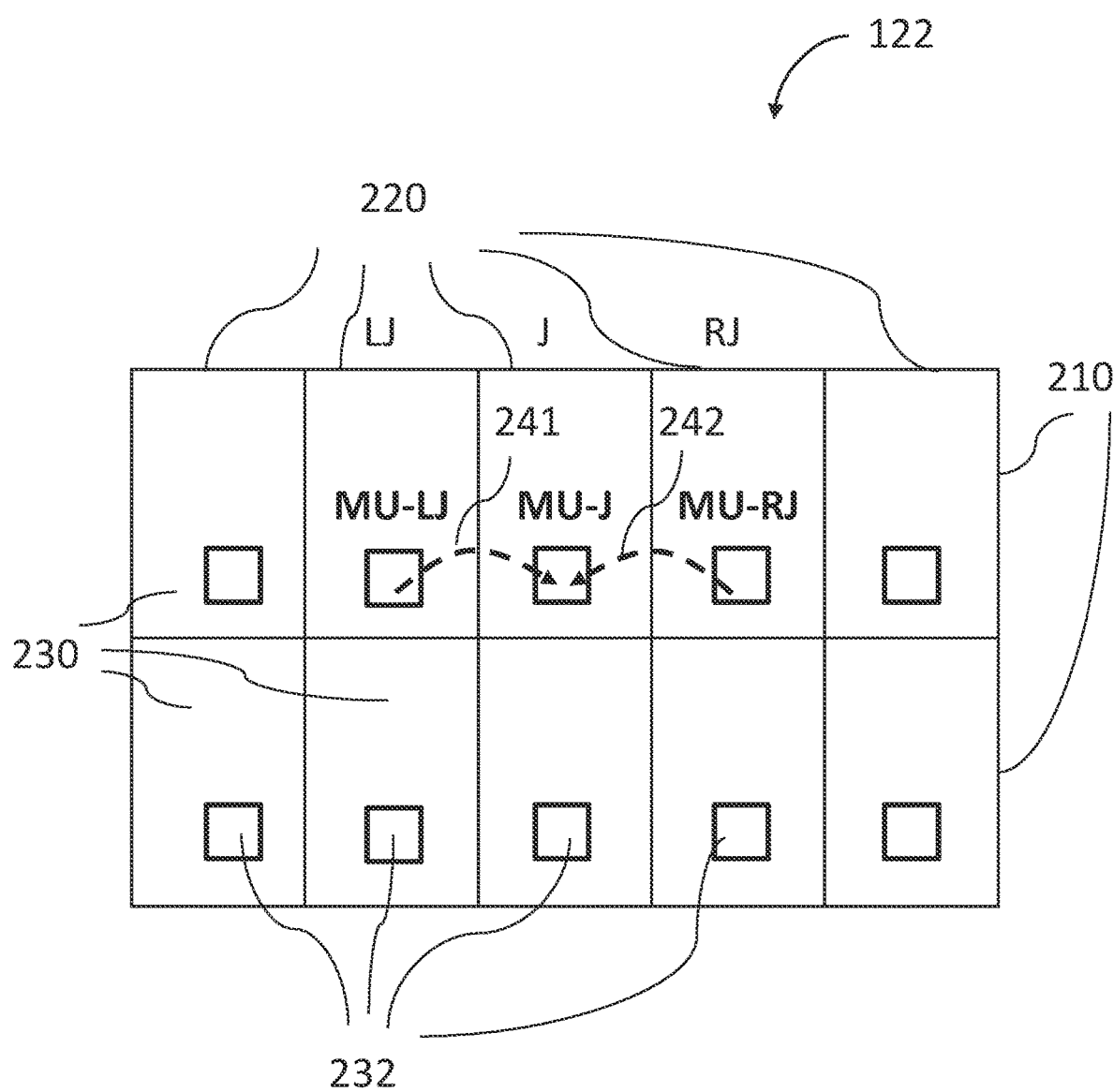
FIGS. 2A and 2B are schematic illustrations of a section of an associative memory array forming part of the system of FIG. 1, constructed and operative in accordance with a preferred embodiment of the present invention.
Figure 2B:
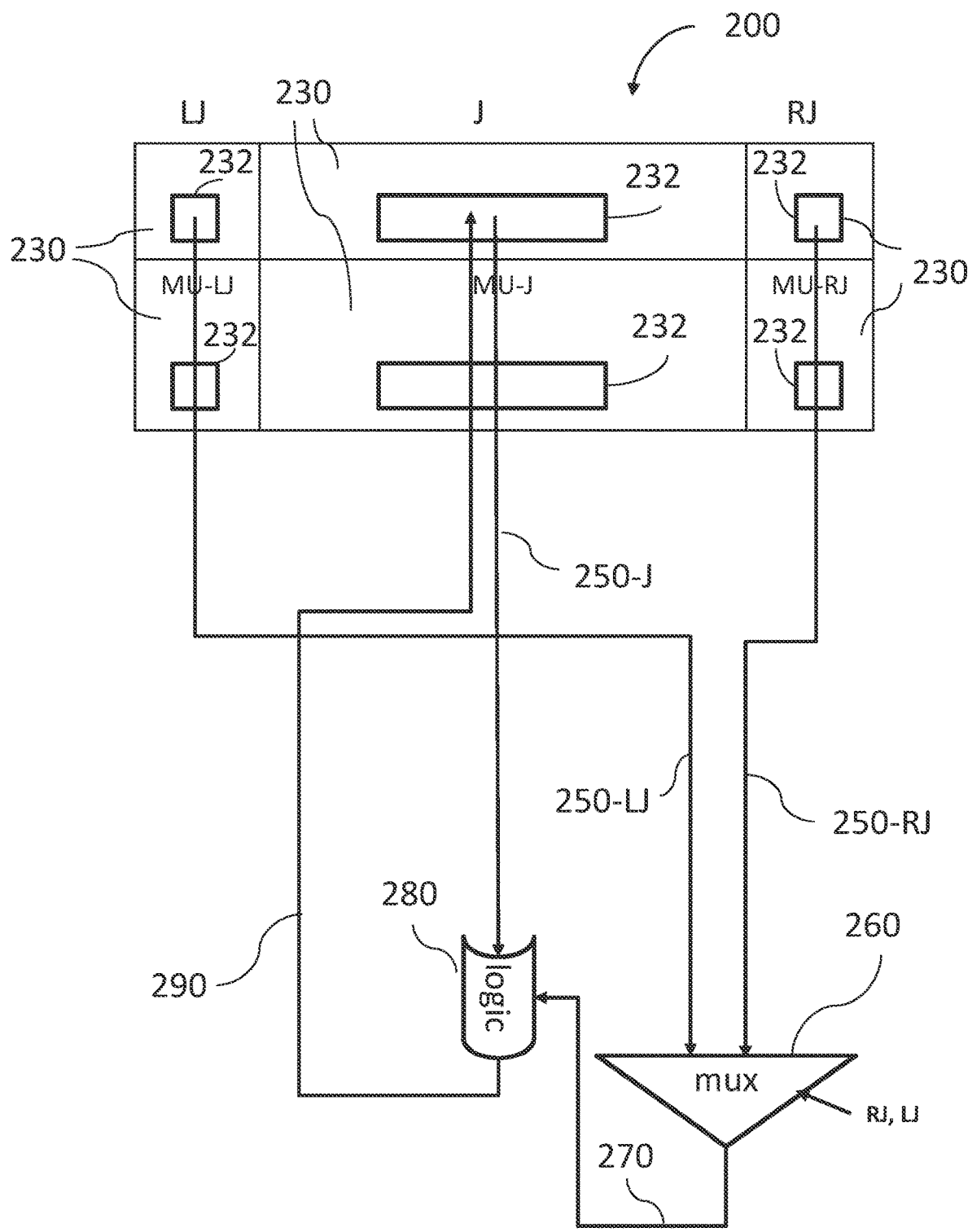

Associative memory array 120 may be a memory device comprising numerous sections 122, constructed and operative in accordance with a preferred embodiment of the present invention and as shown in more detail in FIGS. 2A and 2B, to which reference is now made. Section 122 may be arranged in rows 210 and columns 220 of memory units 230, of which three columns are labeled LJ, J and RJ. Each memory unit 230 may store its own data 232, and may have access to data 232 stored in adjacent memory units on each side. MU-J may read data 232 stored in memory unit 230 to its left, MU-LJ, as shown by dashed arrow 241, or may read data 232 stored in the memory unit 230 to its right, MU-RJ, as shown by dashed arrow 242.

FIG. 2B schematically illustrates circuitry 200 associated with column J of section 122 (of FIG. 2A), constructed and operative in accordance with a preferred embodiment of the present invention. Circuitry 200 may enable memory unit MU-J to access adjacent memory units MU-RJ and MU-LJ and optionally perform Boolean operations between data 232 stored therein, and data 232 of MU-J.

Circuitry 200 comprises two elements: a multiplexer (mux) 260 and a logic unit 280 and wires. Wires of circuitry 200 provide connectivity between memory units 230 of column J and elements of circuitry 200. A wire 250-J may provide connectivity between memory units 230 of column J and logic 280. A wire 250-LJ may provide connectivity between memory units 230 of column-LJ and mux 260. A wire 250-RJ may provide connectivity between memory units 230 of column RJ and mux 260. It may be appreciated that a wire (250-LJ, 250-J, 250-RJ) between a column (11, J, RJ) and an element in circuitry 200 may read data 232 stored in any memory unit 230 in that column. Additionally or alternatively, wires 250-LJ, 250-J, and 250-RJ may provide the result of a Boolean operation performed between data 232 stored in several memory units 230 cells in column LJ, J, RJ respectively.

A wire 270 may provide connectivity between mux 260 and logic 280 and a wire 290 may provide connectivity between logic 280 and MU-J. Mux 260 may select to read data 232 from MU-LJ or from MU-RJ. Logic 280 may read data 232 from MU-J and may receive data from mux 260. Logic 280 may perform Boolean operations between data 232 read from MU-J and data received from mux 260. Logic 280 may write the outcome to a memory unit 230 of column J such as MU-J.

It may be appreciated that using circuitry 200, memory unit MU-J may replace its own stored data with data of an adjacent memory unit. Memory unit MU-J may alternatively perform a Boolean operation between its own stored data 232 and data from an adjacent memory unit and may replace its own data with the result of the executed Boolean operation.

It may be appreciated that similar circuitry may be associated with each column of each section 122 (of FIG. 2A) of associative memory array 120 (of FIG. 1).

Figure 3:
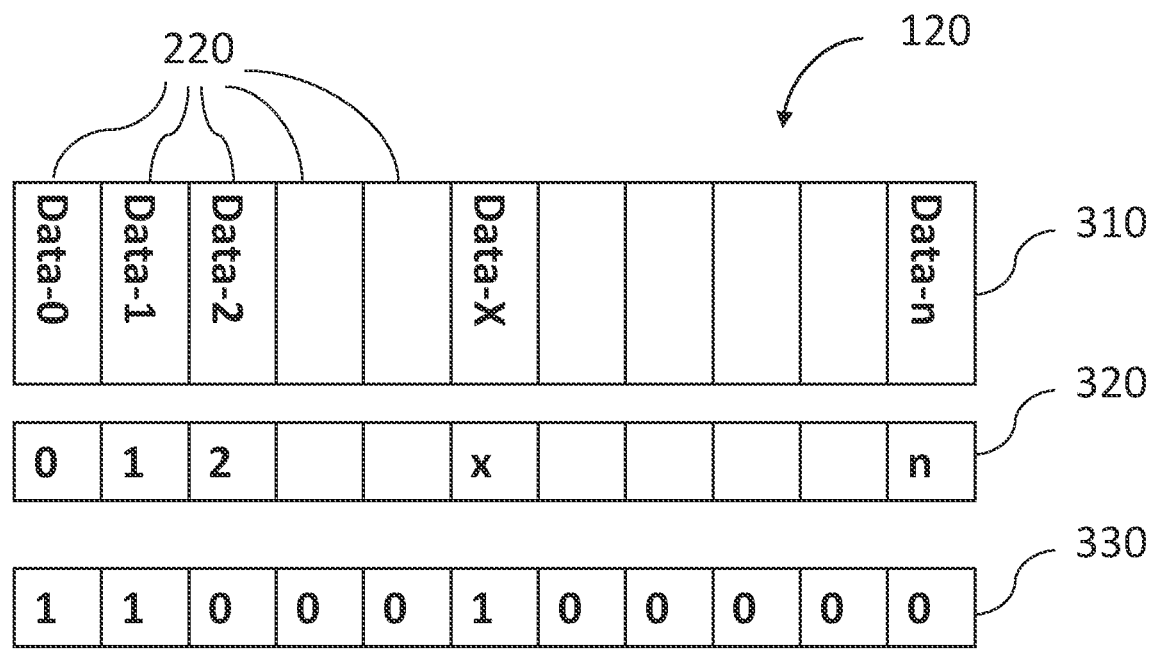
FIG. 3 is a schematic illustration of the data stored in the associative memory array component, according to a preferred embodiment of the present invention.

FIG. 3, to which reference is now made, illustrates the data and the way it is stored in associative memory array 120. Associative memory array 120 may store a dataset 310, an Index 320 having a unique value associated with each item and a Marker vector 330. Each item of dataset 310 may be stored in a dedicated column 220, spanning over several rows. An index related to a specific item may be stored in the same column 220 as the specific item. The indices may form a vector 320 stored in several rows of memory section 122. An indication in a Marker vector 330, stored in a row 210 (FIG. 2A) of section 122, may be stored in the same column of the specific item and may indicate whether the item stored in the column is part of the set. In one embodiment of the present invention, the value 1 in a cell of Marker vector 330 may indicate that the item stored in the column is in the set (accordingly, the value 0 in a cell of Marker vector 330 may indicate that the item stored in the column is not in the set).

As illustrated in FIG. 3, the actual storage and most of the computations is done vertically, in columns. It may be appreciated that the logical operations are performed in parallel on all columns 220, i.e. concurrently on data related to all items stored in the dataset.

FIG. 3 provides an example dataset 310, stored in associative memory array 120. Dataset 310 stores data items: Data-0, Data-1 Data-n. In this example, out of the entire dataset, three items are in the elected set, those having the value 1 in Marker vector 330 and it may be appreciated that, in this example, data items Data-1, Data-2 and Data-x are elected and should be read.

Item selector 110 may use any appropriate "item select" method. As described hereinabove, EIS 114 may select the item having the highest/lowest index in the set. and NIS 116 may select the next item in a linked list of items, starting with the first item in the list, provided that a linked list of the items in the set is built and is accessible in advance. Both EIS 114 and NIS 116 are described in detail hereinbelow.

Figure 4:
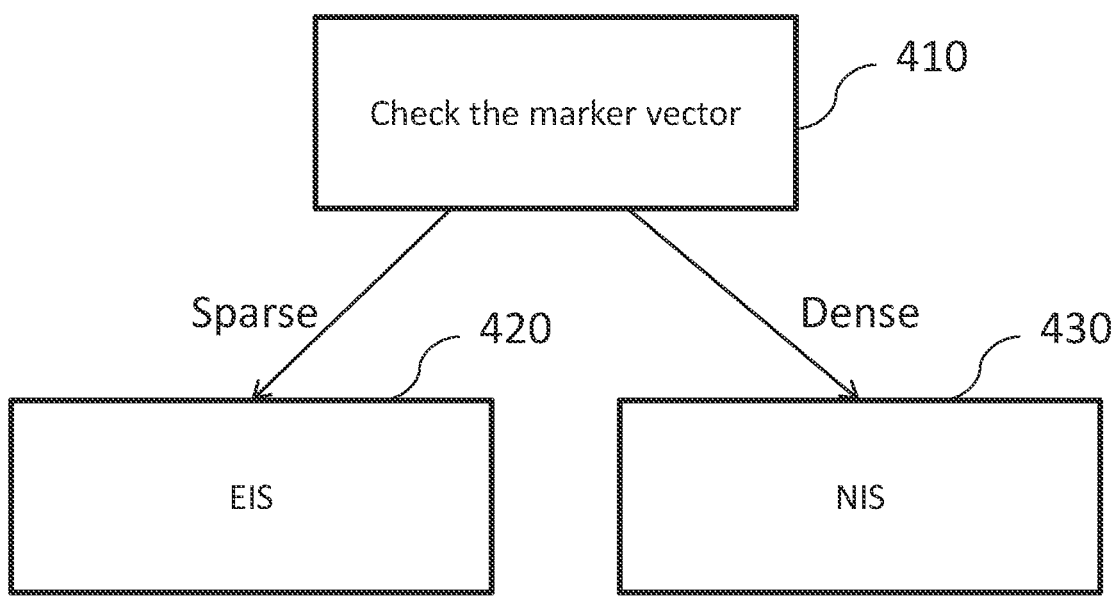
FIG. 4 is a state machine describing the methods used by the system of FIG. 1, according to a preferred embodiment of the present invention.

In one embodiment, item selector 110 may choose to use a method according to the density of the Marker vector 330. As illustrated in FIG. 4, to which reference is now made, Item selector 110 may check (step 410) the density of Marker vector 330. The check may be done by counting the number of markers in Marker vector 330 and dividing the result by the number of items in the entire dataset. If the ratio is smaller than a predefined value (such as 5%, 10%, 15% etc.), the Marker vector 330 may be considered sparse, and dense otherwise. Alternatively, the density may be determined by comparing the number of items in the set to a predefined value, and if the number of items in the set is smaller than the predefined value, Marker vector 330 may be considered sparse.

It may be appreciated that the density of the marker may be evaluated in any other way. When Marker vector 330 is sparse, as indicated in step 420, item selector 110 may use EIS 114, while when Marker vector 330 is dense, as indicated in step 430, item selector 110 may use NIS 116.

It may further be appreciated that item selector 110 may select EIS 114 or NIS 116 according to considerations, other than the density of Marker vector 330. Item selector 110 may use only EIS 114, only NIS 116 and any mixture of EIS 114 and NIS 116.

EIS 114 may consider the index associated with a data item stored in the dataset, and the marker associated with the data item (both stored in the same column) as one composed value (CV) associated with the data item, where the marker bit is the most significant bit (MSB) of the composed value and the index provides the rest of the bits. Considering the CV this way, it is guaranteed that the elected items, marked with "1" in Marker vector 330, will have larger values than non-elected items, marked with "0", as binary numbers having a 1 in their MSB are larger than binary numbers having a 0 in their MSB, and that a single item will eventually be picked since each item has a unique index therefore, the CV is unique, and there will be a single extreme CV.

It may be appreciated that EIS 114 may also consider the index and the inverse of the marker bit (NOT-marker) as the MSB of the CV, and find the lowest index in the set. Considering the CV this way, it is guaranteed that the elected items, marked with "1" in Marker vector 330 will have a 0 (NOT 1) as the MSB of their CV ensuring that they have smaller values than non-elected items, which have a 1 (NOT 0) in their MSB.

EIS 114 may utilize any search method to find a maximum or a minimum value between the CVs. It may be appreciated that U.S. Pat. No. 9,859,005, incorporated by reference, may describe a method for finding a maximum value in a dataset, with constant computation complexity regardless of its size, and may be used by EIS 114.

Figure 5:
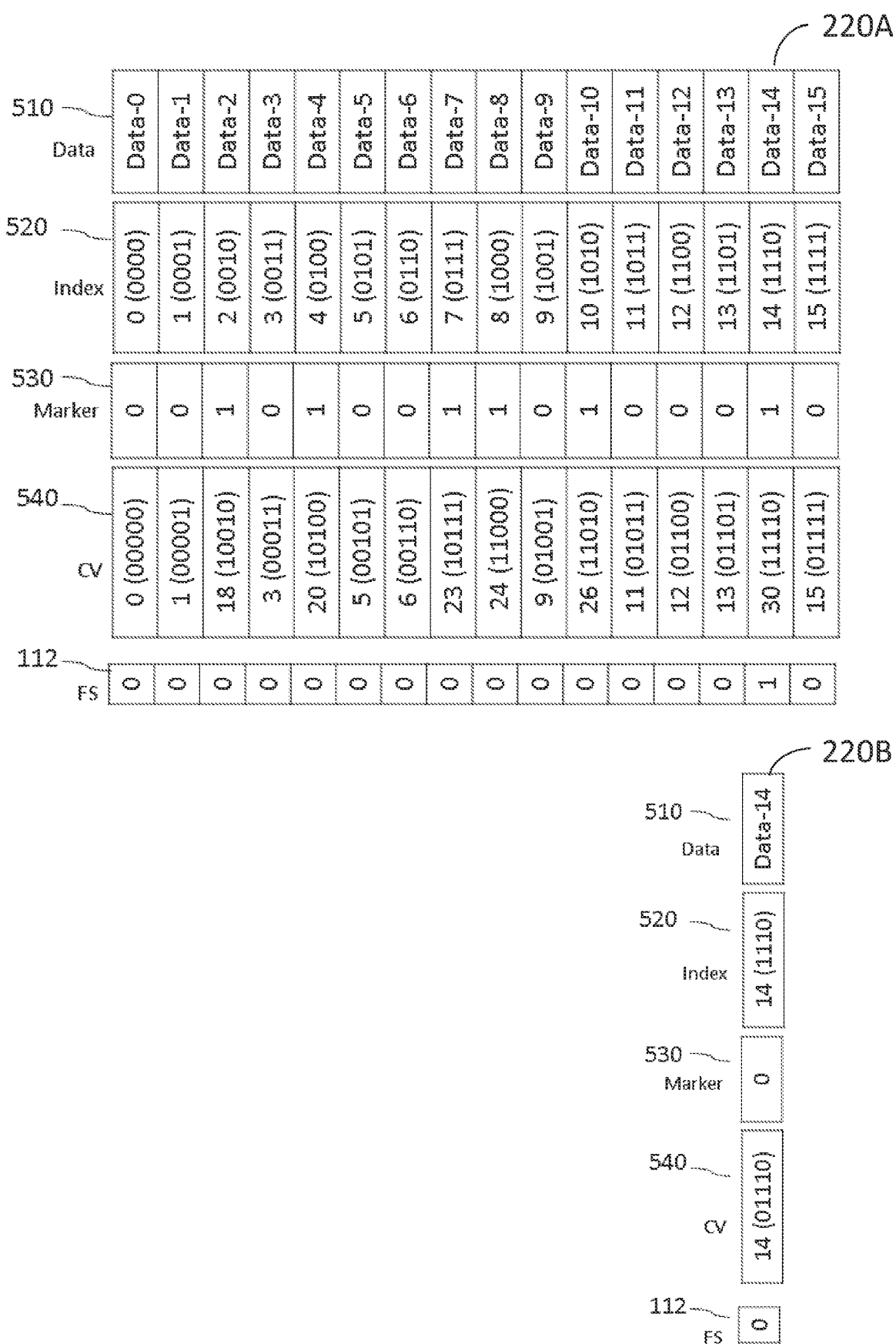
FIG. 5 is a schematic illustration of exemplary data stored in the system of FIG. 1 and its usage by an extreme item selector, according to a preferred embodiment of the present invention.

FIG. 5, to which reference is now made, illustrates exemplary data stored in system 100 and its usage by the EIS 114 method. The different data items stored in system 100 are presented by several horizontal vectors: Data 510 storing the actual data; Index 520 storing the indices of the stored items; and Marker vector 530 storing the elected set of items. Additional information used by item selector 110 is a CV vector 540 and an FS vector 112 having an indication of the item selected by item selector 110 in a specific fetch request. It may be appreciated that CV 540 may not be actually stored in item select system 100 and is illustrated in FIG. 5 for clarity. It may be appreciated that for clarity, a value stored in location x of a vector is represented herein as vector[x].

In the example of FIG. 5, Marker vector 530 includes an indication in Marker[2], Marker[4], Marker[7], Marker[8], Marker[10] and Marker[14] indicating that items whose indices are 4, 7, 8, 10 and 14 respectively are in the set of elected items. It may be appreciated that the data items located in those indices are data-2, data-4, data-7, data-8, data-10 and data-14 respectively. CV 540 may be created by referring to the bit of Marker vector 530 as the MSB of a value created by the marker and the index of a data item. It may further be appreciated that the largest values in CV 540 are 18, 20, 23, 24, 26, 30, which are associated with items data-2, data-4, data-7, data-8, data-10 and data-14 as expected.

Using the method described in U.S. Pat. No. 9,859,005, item selector 110 may find the largest number in CV 540. It may be appreciated that data item Data-14 is associated with 30 which is the largest value in CV 540. Item selector 110 may set the value of FS[14] as 1 in FS 112, as shown, and may then read the item associated with FS[14].

After reading/fetching the item, item selector 110 may zero Marker[14], the bit associated with the relevant read data item, essentially removing the read item from the set.

After zeroing the marker bit, CV[14] may be recalculated and FS[14] may be zeroed. The original values are indicated by column 220A and the modified values are indicated by column 220B. Item selector 110 may now be ready for another operation of EIS 114.

It may be appreciated that these steps, of finding the largest value and nulling the entry in Marker vector 530, are repeated until there are no more marked objects in Marker vector 530, i.e. the set is empty.

As already mentioned hereinabove, when the number of items in the set is large, NIS 116 may be more efficient, as a linked list is built once, and once built, all relevant items may be directly accessed (instead of a maximum or a minimum search operation).

NIS 116 may create a linked list of indices of marked items by computing the "deltas" between the markers. A delta is the number of cells in the marker vector having a value of "0" between each two consecutive cells having a value of "1". Each computed delta may be added to the index of the current elected item, to get the index of the next elected item.

Figure 6:
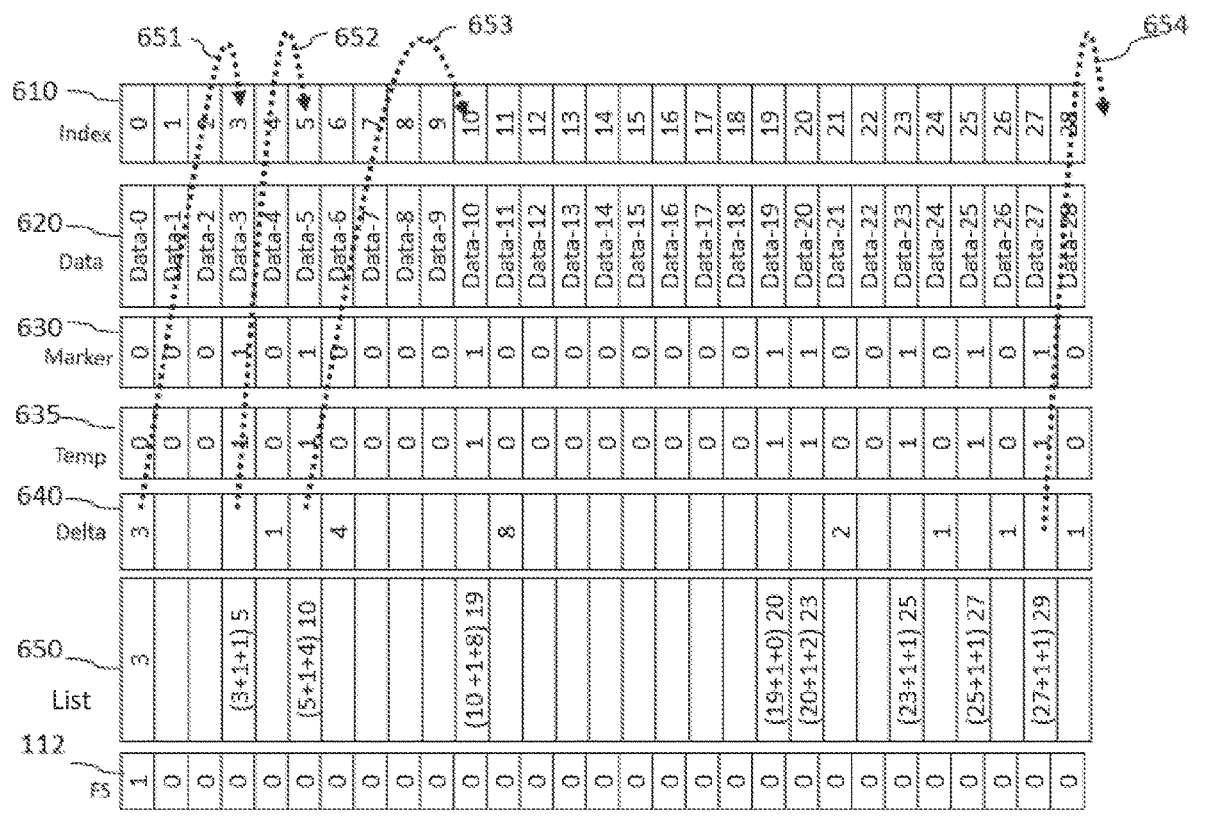

FIG. 6, to which reference is now made, illustrates exemplary data stored in system 100 and its use by NIS 116. The different data items stored in system 100 are presented by several horizontal vectors: Index 610 containing the indices of the stored items; Data 620 containing the actual data; and Marker vector 630 containing the elected set of items. NIS 116 may use additional information: a temporary vector, Temp 635, used for intermediate computations; a Delta vector 640; a List 650 and an FS vector 112 having an indication of one item currently selected by item selector 110.

In the example of FIG. 6, the Marker vector 630 includes an indication in Marker[3], Marker[5], Marker[10], Marker [19], Marker[20], Marker[23], Marker[25] and Marker[27] which indicates that items whose indices are the values of Index[3], Index[5], Index[10], Index[19], Index[20], Index [23], Index[25] and Index[27] respectively, i.e. data-3, data-5, data-10, data-19, data-20, data-23, data-25 and data-27, are in the set of elected items and linked list 650 should include these indices.

NIS 116 may first concurrently compute the deltas between markers in Marker vector 630 where the delta is the number of zeros between each two consecutive ones in Marker vector 630. The first item in the linked list may be the value of the first delta. In the example, the first marker bit is associated with the item whose index is 3, so the first value in List 650 (i.e. the value located in index 0) is 3 (List[0]=3). The next items in the List 650 may be computed by adding the delta (to the next marker) to the index of the current marked item, plus one which is the space occupied by the current marked item. The formula for computing the values of the items in List 650 is defined in Equation 1.

$$\text{List}[x]=\text{Index}[x]+\text{Delta}[x+1]+1 \quad \text{Equation 1}$$

In the example, the next item in List 650 is List[3]. The value to store in List[3] is computed by adding the relevant value from Delta 640, Delta[3+1], which in this example is 1 and adding another 1, i.e. List[3]=3+1+1=5. Arrow 651 visually points to the column pointed by the first item in List 650. The next item in List 650 is stored in the location pointed by the previous item, i.e. in List[3]. Arrow 652 visually points to the item pointed by the List[3], and arrow 653 visually points to the next item in the list. It may be appreciated that the value of the last item in List 650 may be invalid as it may point outside the linked list. In the example, and as illustrated by arrow 654, the last bit set in Marker 630 is Marker[27], and it "points" to 29 which is outside the list. The detailed mechanism for building the linked list and for using it is described hereinbelow.

Figure 7:
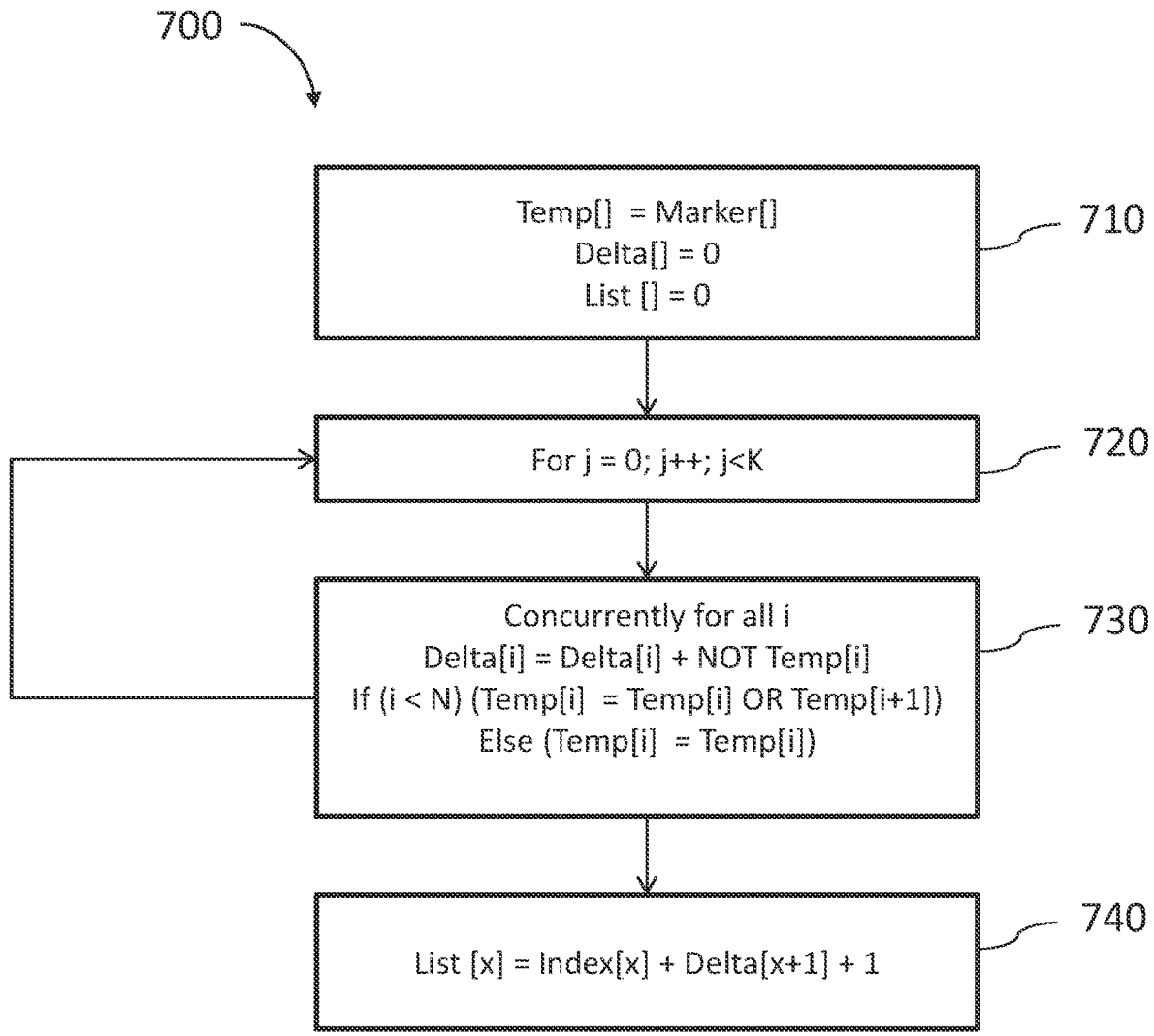
FIG. 7 is a flow chart illustration showing steps performed by the next item selector of FIG. 6 for building a linked list, according to a preferred embodiment of the present invention.

Reference is now made to FIGS. 7, 8 and 9. FIG. 7 is a flow chart 700 describing steps performed by NIS 116 for building a linked list. FIGS. 8 and 9 show the data of Delta 640 and List 650 while performing the steps of flow 700. In step 710, NIS 116 may create Delta 640 and List 650 and may initialize them to 0. In addition, NIS 116 may create Temp 635, to store a copy of Marker 630 to be used and manipulated during computation while keeping the original values of Marker 630 untouched for later use.

FIG. 8 illustrates an example of values stored in Index 610, Marker 630, Temp 635, Delta 640 and List 650 in step 710 of FIG. 7. Returning to FIG. 7, step 720 is a loop that may repeat the computation of step 730 K times. K is a certain predefined value that may be defined by any heuristic such as a fixed number, the size of the dataset divided by the number of marks, the size of the dataset divided by the number of marks times 2, or any other heuristic.

Step 730 describes how the delta is concurrently computed in the entire vector. The value Delta[i], in each location i of Delta 640, (i=0 . . . N, N is the size of the dataset) is incremented as long as there is a "0" in the same location in the temporary vector, i.e. in Temp[i]. In each iteration, the value in each cell i of Temp vector 635 may be calculated as the result of a Boolean OR of the value of cell i and the value of cell i+1, which is the next cell in the vector as defined in Equation 2.

$$\text{Temp}[i]=\text{Temp}[i] \text{ OR Temp}[i+1] \quad \text{Equation 2}$$

It may be appreciated that the effect of the Boolean OR operation on the entries of Temp 635 is essentially to copy entries having the value "1" to the left at most K times. It may be appreciated that only the value 1 is copied to the left, while a value of 0 is not copied. As long as the value of an entry in Temp 635 is "0", the value of Delta 640 is incremented. i.e. in each iteration, the value of each cell Delta[i] in Delta vector 640 may be calculated as Delta[i] plus the inverse of the value stored in the respective cell, Temp[i], in Temp 635, as defined in Equation 3.

$$\text{Delta }[i]=\text{Delta }[i]+\text{NOT}(\text{Temp}[i]) \quad \text{Equation 3}$$

The result is that, over the iterations, each Delta[i] will be incremented by 1 until Temp[i] becomes 1.

FIG. 9, to which reference is now made, illustrates the values of Delta 640 and Temp 635 after several iterations. Temp₁ illustrates the values of Temp 635 after the first iteration, Temp 2 illustrates the value of Temp 635 after the second iteration, and $\text{Temp}_k$ illustrates the value of Temp 635 after the last ($K^{th}$) iteration, where the value of each cell in Temp 635 is calculated using Equation 2. It may be appreciated that the value of the last cell of Temp 635 does not change as there is no cell after the last. Note that the value of a cell in Temp 635 may be changed from 0 to 1 but not vice versa, from 1 to 0. It may be appreciated that after the last iteration, the distance between $\text{Delta}_k[0]$ and the nearest set marker (in Marker 630) is 3, the distance between $\text{Delta}_k[1]$ and the nearest Marker is 2, between $\text{Delta}_k[2]$ and the nearest marker is 1 and $\text{Delta}_k[3]$ is the actual location of the marker thus the distance to the nearest marker is 0.

$\text{Delta}_1$ illustrates the values of Delta 640 after the first iteration, $\text{Delta}_2$ illustrates the value of Delta 640 after the next iteration and $\text{Delta}_k$ illustrates the value of Delta 640 after the last ($K^{th}$) iteration where the value of each cell in Delta 640 is computed using Equation 3. Note that, the value of a cell is increased and represents the number of zeroes encountered in Temp 635 in the past iterations for each i, and eventually the number of zeros between an item and the next marked item.

Returning to FIG. 7, step 740 describes the calculation of List 650 after the last iteration of step 730. List 650 may be created from the deltas stored in Delta 640, and Index 610. The first item in List 650 may be the value of the first delta, which may be associated with the first item in the dataset having the index 0. All the items of List 650, except the first one, may be calculated as a function of the delta and the index of the item "pointing" to the next one, as defined in Equation 1 hereinabove.

Figure 10:
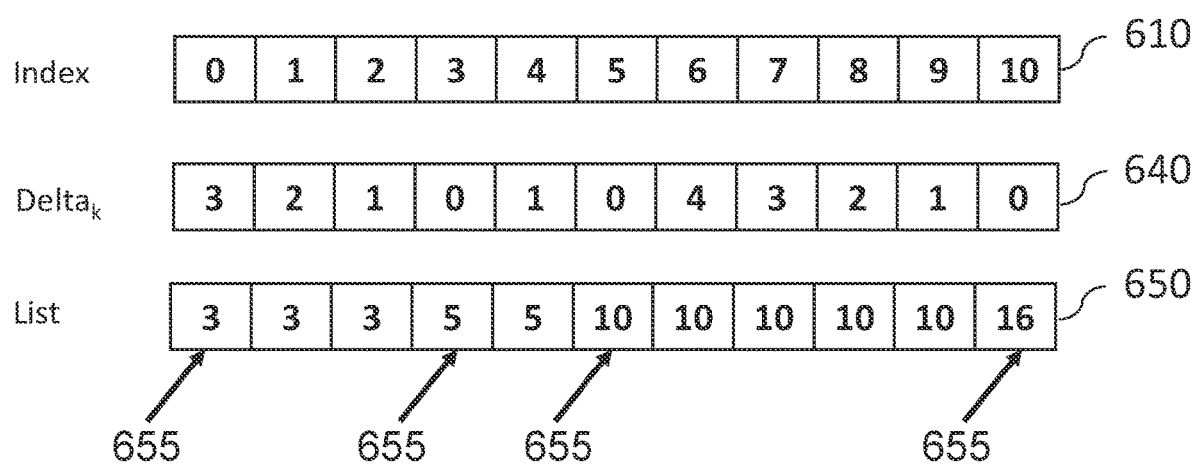
FIG. 10 is a schematic illustration of a final linked list created by the flow of FIG. 7, according to a preferred embodiment of the present invention.

FIG. 10, to which reference is now made, illustrates the value of List 650 calculated using the values stored in Temp 635 and in Delta 640, as shown. It may be appreciated that the first item in List 650 points to the first marked item, i.e. List[0]=3. The next item in List 650 is List[3] that points to 5. The entries of List 650 are pointed to by arrows 655 and the other entries of the list have meaningless values, which are not used by NIS 116.

It should be noted that K, the number of iterations, is selected without any connection to the actual deltas between markers in an actual marker vector. Thus, it is possible that there may be a delta which is larger than K. In this case, the large delta cannot be computed in only K iterations and thus, it will not be listed in List 650. Instead, List 650 may contain entries List[x] that are intermediate pointers that point to an unmarked item, i.e. the value of Marker[x] may be 0. Nevertheless, List[x] may point to another entry in List 650 that may eventually be associated with a marked entry.

Figure 11:
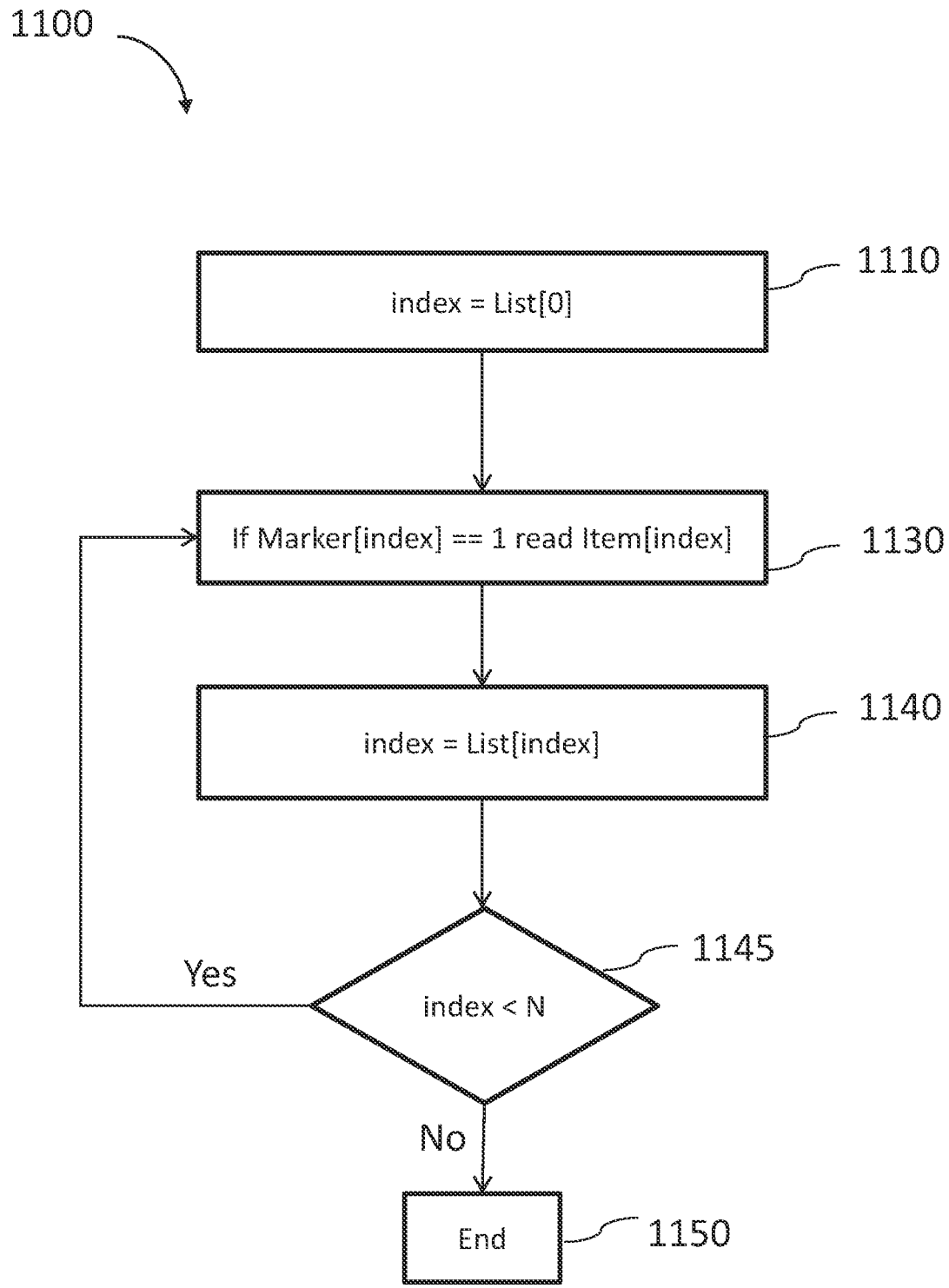
FIG. 11 is an item fetching flow, implemented by the next item selector, according to a preferred embodiment of the present invention.

Once List 650 is ready, it can be used for reading the items. The item fetching flow, implemented by NIS 116, is described in FIG. 11, to which reference is now made. Flow 1100 describes in step 1110 that the first item to be read may be the one with the index located in the first item of the list, i.e. index=List[0]. Step 1130 indicates that if the marker is set, i.e. Marker[index]==1, NIS 116 (of FIG. 1) may fetch Data[index], and in step 1140, NIS 116 may read the index of the next item to fetch from the current location in the list, i.e. index=List[index]. Step 1145 checks that the index is valid, i.e. its value is less than N, which is the size of the set. If the index is larger than the set, the flow terminates in step 1150.

It may be appreciated by the person skilled in the art that the steps shown in flow 700 and flow 1100 are not intended to be limiting and that both flows may be practiced with more or less steps, or with a different sequence of steps, or any combination thereof.

It may be appreciated that item select system 100 may reduce the computation time for fetching elected items from a database. The computation steps may be performed concurrently on all cells of the vectors Temp 635 and Delta 640. The abilities of the associative memory device, that is, concurrent Boolean operation on all columns and concurrent access to data stored in adjacent cells in the same row, may provide a computation complexity that does not depend on the vector size for both methods of item select. For a set of size P, the computation complexity of EIS 114 is O(P) and the computation complexity of NIS 116 is O(K).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for selecting items one by one from a set of items elected from a large dataset of items, the method comprising:
    determining whether or not a density of said set is sparse;
    if said density is sparse, repeatedly performing an extreme item select (EIS) method to select a next one of said elected items from said set and removing said next one from said set to create a next set; and
    if said density is not sparse, performing a next index select (NIS) method to create a linked list of said elected items and to repeatedly select a next elected item from said set.

2. The method of claim 1 wherein said dataset is stored in an associative memory array.

3. The method of claim 1 also comprising creating a marker vector having a same size as said dataset, wherein all indices of said elected items have a first value and all indices of non-elected items have a second value.

4. The method of claim 3 wherein said first value is "1" and said second value is "0".

5. The method of claim 3 wherein said determining comprises:
    counting a number of said first value in said marker vector to produce a size;
    dividing said size by a number of items in said dataset; and
    comparing a result of said dividing to a predefined value to provide said density.

6. The method of claim 3 wherein said determining comprises:
    counting a number of said first value in said marker vector to produce a size; and
    comparing said size to a predefined value to provide said density.

7. A system for selecting items one by one from a set of items elected from a large dataset of items, the system comprising:
    an associative memory array;
    a marker vector;
    an item selector to determine if a density of said set is sparse;
    an extreme item selector (EIS) to repeatedly select a next one of said elected items from said set and to remove said next one from said set to create a next set if said set is sparse; and
    a next index selector (NIS) method to create a linked list of said elected items and
    to repeatedly select a next elected item from said set if said set is not sparse.

8. The system of claim 7, wherein said associative memory array to store said dataset.

9. The system of claim 7, wherein said marker vector has a same size as said dataset and wherein indices of said elected items are marked with a first value and indices of non-elected items are marked with a second value.

10. The system of claim 9 wherein said first value is "1" and said second value is "0".

* * * * *